(12) United States Patent
Ortiz et al.

(10) Patent No.: US 7,019,503 B1
(45) Date of Patent: Mar. 28, 2006

(54) ACTIVE POWER FILTER WITH INPUT VOLTAGE FEEDFORWARD, OUTPUT LOAD FEEDFORWARD, AND OUTPUT VOLTAGE FEEDFORWARD

(75) Inventors: Joe A. Ortiz, Garden Grove, CA (US); Joseph K. Miyamoto, Torrance, CA (US); Frank H. Wang, Rosemead, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/053,295

(22) Filed: Feb. 7, 2005

(51) Int. Cl.
*G05F 1/40* (2006.01)

(52) U.S. Cl. .................. 323/282; 323/222; 363/81; 363/89

(58) Field of Classification Search ............... 323/282, 323/286, 284, 222, 223, 207, 239; 363/84, 363/89, 65, 45, 44, 82
See application file for complete search history.

(56) References Cited

U.S. PATENT DOCUMENTS

| | | | |
|---|---|---|---|
| 5,777,866 A * | 7/1998 | Jacobs et al. ............... 363/126 |
| 6,101,108 A * | 8/2000 | Wittenbreder, Jr. .......... 363/65 |
| 6,259,614 B1 * | 7/2001 | Ribarich et al. ............. 363/89 |
| 6,657,417 B1 * | 12/2003 | Hwang ....................... 323/222 |

* cited by examiner

*Primary Examiner*—Rajnikant B. Patel
(74) *Attorney, Agent, or Firm*—John E. Gunther; Leonard A. Alkov; Karl A. Vick

(57) ABSTRACT

Active power filters and methods control and regulate the input current drawn from an electric power bus to a DC level. Load current fluctuations and ripple current reflected back to the electric power bus are significantly reduced or substantially eliminated. A switch mode power converter with a very low bandwidth output voltage regulation control loop uses input voltage feedforward, output load feedforward, and output voltage feedforward to provide a regulated DC input current significantly attenuating input ripple current drawn from the electric power bus.

31 Claims, 11 Drawing Sheets

ACTIVE POWER FILTER WITH INPUT VOLTAGE FEEDFORWARD, OUTPUT LOAD FEEDFORWARD, AND OUTPUT VOLTAGE FEEDFORWARD

TECHNICAL FIELD

The present invention pertains to electrical power systems, in particular to current and voltage regulation, and more particularly to active power filters.

BACKGROUND

Electronics systems, such as communication systems, radar systems, infrared sensor systems, laser-tracking systems, or directed-energy systems, whether ground based, mobile, airborne, shipboard, or spacecraft based, generally have several subsystems that are provided power from a power source over an electric power bus. Certain subsystems may draw a ripple current from the power source that may affect the other subsystems. Several specifications, such as MIL STD 461, address the quantity and frequency content of ripple current that may be reflected to an electric power bus, in addition to other EMC requirements.

For example, in the case of certain types of sensor systems, a cryogenic cooler drive electronics system may draw 10 amps or more of ripple current at a nominal frequency between 70 and 100 Hz from the electric power bus. In some applications, such as a satellite system, this large ripple current draw may destabilize the bus and may degrade the performance of other electronics subsystems using the bus, particularly those managing low power sensor signals. For another example, in the case of a laser system that generates pulsed output energy, or a directed energy system that generates pulses of RF energy, the current required for the pulsed output may similarly reflect back to an electric power bus, and may destabilize the electric power bus.

Conventional approaches to reduce the ripple current on an electric power bus utilize low-frequency low-pass passive filters with large capacitors and inductors. However, the size and weight of the large capacitors and inductors required for low-frequency low-pass filter bandwidth make these approaches undesirable for applications where size and/or weight are important factors. Other conventional approaches include the use of shunt regulators in parallel with the fluctuating load. These shunt regulators draw load current under light load conditions and reduce shunt power under system heavy load conditions, thus keeping the net current draw from a power source constant. Although this approach may work well for relatively light fluctuating loads, it wastes power. At high power or for a large quantity of shunt regulators, the power dissipation of the shunt loads may become excessive, increasing net total power draw and reducing the efficiency of the power system. Other conventional approaches include the use of AC-coupled shunt regulators, but these can also suffer from excessive power dissipation, and because they are AC-coupled, they can suffer from bandwidth limitations.

Thus, there are needs for systems and methods that control and regulate input current drawn from an electric power bus. There are also needs to attenuate ripple current reflected to an electric power bus. There are also needs for systems and methods that attenuate input ripple current drawn from an electric power bus without the use of large capacitors, large inductors, or shunt regulators. There are also needs for systems and methods that attenuate input ripple current drawn from an electric power bus suitable for electronics systems, including ground based, mobile, airborne, shipboard, or spacecraft systems.

SUMMARY

Active power filters and methods are provided that, in some embodiments, control and/or regulate the input current drawn from an electric power bus to a near DC level. Load current fluctuations and ripple current reflected back to the electric power bus may be significantly reduced, and in some embodiments, may be substantially eliminated. The active power filter of some embodiments utilizes a switch-mode power converter with a very low bandwidth output voltage regulation control loop, which uses input voltage feedforward, output load feedforward, and output voltage feedforward, to provide a regulated DC input current. This may significantly attenuates input ripple current drawn from an electric power bus at significantly reduced size and weight over passive filtering. The active power filter of some embodiments of the present invention may be similar to a conventional switch-mode DC power supply, but whereas the typical DC power supply provides a regulated output (e.g., normally regulated DC voltage), the active power filter of some embodiments of the present invention may provide a regulated input (e.g., a DC input current). This may significantly attenuate input ripple current drawn from an electric power bus, while also delivering a regulated DC output voltage.

In some embodiments, current mode control is used to provide the regulated input current. In a current mode control converter, the switch current is compared to the error amplifier output to control the switch duty cycle on a cycle-by-cycle basis. The switch current may be regulated on a cycle-by-cycle basis, and thus, a current mode control converter may be used to regulate input current to a DC level if the error amp output voltage does not modulate at the frequencies of the ripple to be attenuated. This may be accomplished by the use of a low or very low bandwidth control loop to regulate output voltage.

The active filter output voltage may be regulated, but as explained above, the regulation loop may utilize a low or very low bandwidth control loop to prevent output load current fluctuations from reflecting back to the electric power bus. Given this low or very low bandwidth loop, a converter may be unable to rapidly respond to changes in input voltage and output load current, and output voltage regulation may suffer. Embodiments of the present invention use input voltage feedforward and output load feedforward to help maintain output voltage regulation.

However, irrespective of the low or very low bandwidth of the output voltage regulation loop, the average current of the switch-mode converter filter inductor may be modulated by the output voltage ripple, and thus average input current may be modulated by the output voltage ripple. In accordance with some embodiments of the present invention, modulation of the input current may be substantially cancelled by a small amount of offset modulation produced by the combining of an output voltage feedforward signal with the input voltage feedforward and output load feedforward signals.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Figure 1:
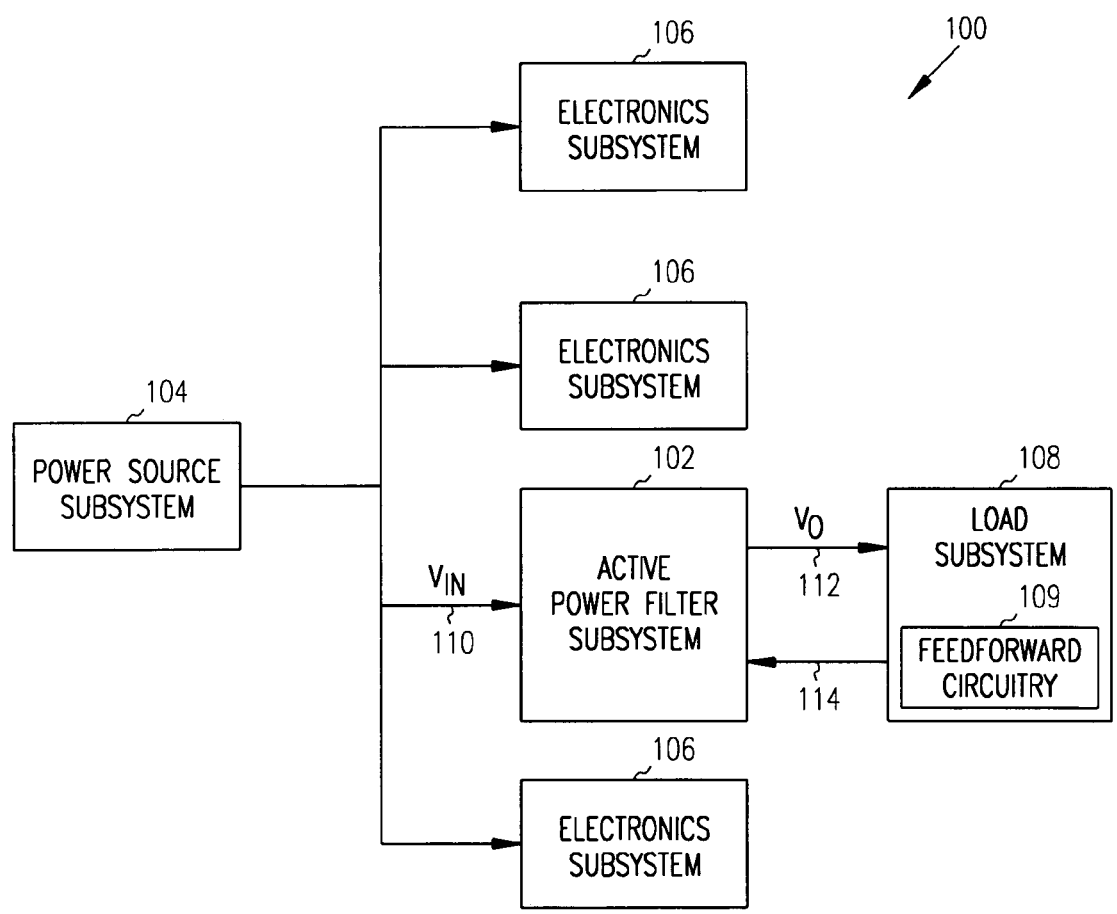
FIG. 1 is a functional block diagram of an electronics power distribution system in accordance with some embodiments of the present invention.

FIG. 1 is a functional block diagram of an electronics power distribution system in accordance with some embodiments of the present invention. System 100 may be any electronics power distribution system that supplies power to one or more subsystems. In some embodiments, one or more subsystems of system 100 may draw a ripple current that may affect power supplied to other subsystems. Examples of system 100 include, but are not limited to, power systems in communication systems, radar systems, infrared sensor systems, laser-tracking systems, or directed energy systems. These systems may be ground based, mobile, airborne, shipboard, or spacecraft based systems.

System 100 includes power source subsystem 104, active power filter subsystem 102, load subsystem 108, and other electronics systems and subsystems 106. Power source subsystem 104 may supply power to one or more systems and subsystems, such as electronics subsystems 106. Load subsystem 108 may be an electronics system or subsystem, an electromechanical system, or an electronics system/subsystem driving an electromechanical system. In some embodiments, power source subsystem 104 provides input current 110 to active power filter subsystem 102 as well as input current to other systems and subsystems 106. Load subsystem 108 may draw output current 112 from active power filter subsystem 102. In some embodiments, output current 112 may have a significant output ripple current at a nominal frequency, which may range, for example, between 70 and 100 Hz, although the scope of the invention is not limited in this respect. In some embodiments, the output ripple current may range up to ten amps peak-to-peak, or greater, although the scope of the invention is not limited in this respect. Load subsystem 108 may include feedforward circuitry 109 to generate output load feedforward signal 114. Signal 114 may indicate the relative power and/or output current 112 drawn by load subsystem 108. Alternatively, signal 114 may indicate changes in output current 112 drawn by load subsystem 108.

In accordance with some embodiments of the present invention, active power filter subsystem 102 provides output current 112 to load subsystem 108 by regulating an output voltage (Vo) for load subsystem 108. In these embodiments, active power filter subsystem 102 may also tightly regulate input current 110 drawn by active power filter subsystem 102 from power source subsystem 104 to a DC level, based at least in part on output load feedforward signal 114, thus providing significant attenuation of input ripple current. Active power filter subsystem 102 may also tightly regulate input current 110 drawn by active power filter subsystem 102 from power source subsystem 104 to a DC level, based on the input voltage (Vin), thus providing significant attenuation of input ripple current. Accordingly, a significant ripple current drawn by load subsystem 108 may have little or no effect on the input voltage supplied to other system components, such as electronics subsystems 106, by power source subsystem 104. In some embodiments, input current 110 may be supplied by power source subsystem 104 on a 28-volt power bus, although the scope of the invention is not limited in this respect.

In some embodiments, active power filter subsystem 102 includes control circuitry to combine at least some of an error amplifier output voltage, an input voltage feedforward signal, an output load feedforward signal 114, and an output voltage feedforward signal to generate a control signal. This is described in more detail below.

In some embodiments, the control circuitry of active power filter subsystem 102 includes an error amplifier set up as an integrator to regulate the output voltage (Vo). The error amplifier may have a bandwidth significantly less than the frequencies to be attenuated to regulate the output voltage Vo while input current 110 drawn by the active power filter subsystem 102 may be tightly regulated to a DC level, thus providing significant attenuation of the input ripple current. This is also described in more detail below.

In some embodiments, system 100 may comprise a satellite system, and load subsystem 108 may comprise a cryogenic cooling system having a motor to drive a cryogenic cooling pump. In these embodiments, circuitry 109 generates output load feedforward signal 114 indicating the relative load power or load current that the motor draws, or is anticipated to draw. Active power filter subsystem 102 may regulate the output voltage (Vo) for the motor drive electronics, and may tightly regulate input current 110 drawn by active power filter subsystem 102 for the motor to a DC level based at least in part on output load feedforward signal 114, and at least in part on input voltage Vin, thus providing significant attenuation of the input ripple current.

In some other embodiments, system 100 may comprise a system for generating pulsed energy, such as laser or RF energy. In these embodiments, load subsystem 108 may comprise a laser or RF amplifier and control electronics (e.g., part of load circuitry 109), which generate output load feedforward signal 114 indicating that the amplifier draws or will draw either an increased or decreased amount of time-averaged output current from active power filter subsystem 102. In these embodiments, active power filter subsystem 102 may regulate an output voltage Vo for the subsystem 108, and may tightly regulate input current 110 drawn by active power filter subsystem 102 for the subsystem 108 to a DC level, based at least in part on output load feedforward signal 114 and based at least in part on the input voltage Vin, thus providing significant attenuation of the peak input current and/or input ripple current.

Figure 2:
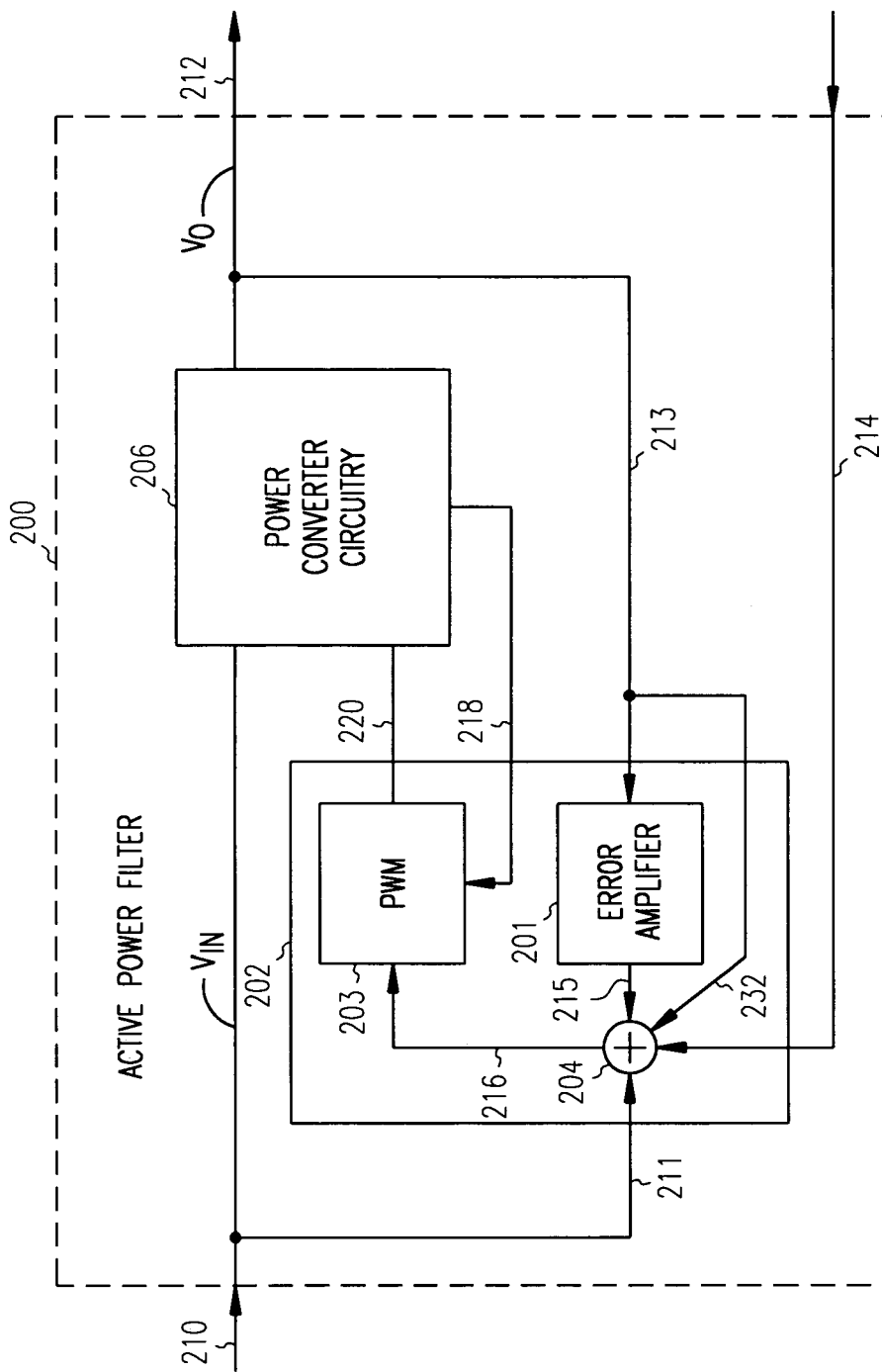
FIG. 2 is a functional block diagram of an active power filter in accordance with some embodiments of the present invention.

FIG. 2 is a functional block diagram of an active power filter in accordance with some embodiments of the present invention. Active power filter 200 receives input current 210 from a power source, such as power source subsystem 104 (FIG. 1), and provides output current 212. In some embodiments, active power filter 200 may achieve an input ripple current attenuation possibly exceeding 30 dB at significantly reduced size and weight over passive filtering. Active power filter 200 includes control circuitry 202 which senses output voltage feedback signal 213 and combines error amplifier output voltage 215, input voltage feedforward signal 211, output load feedforward signal 214, and/or output voltage feedforward signal 232 to generate control signal 216 that may be compared to the current sense signal 218 to control the input current on a cycle-by-cycle basis. This may regulate input current 210 to a near DC level, thus providing significant attenuation of the input ripple current.

Control signal 216 may be generated by summing circuitry 204 and may be a summation of error amplifier output voltage 215, input voltage feedforward signal 211, output load feedforward signal 214, and output voltage feedforward signal 232. In some embodiments, the signal inputs may be scaled and weighted as illustrated in the following equation:

$$VE = K1*VA + K2*VIN + K3*IFF + K4*V_oFF + K5$$

In the above equation, K1, K2, K3, K4 and K5 are weighting constants, VA corresponds to error amplifier output voltage 215, VIN corresponds to input voltage feedforward signal 211, IFF corresponds to output load feedforward signal 214, and $V_oFF$ corresponds to output voltage feedforward signal 232. The weighting constants may be zero, positive or negative depending on the circuitry employed. In some embodiments, weighting constant K4 may be selected for the output voltage feedforward signal 232 to modulate the control signal to substantially offset modulation of the input current due to the output voltage ripple. Although output voltage feedforward signal 232 and output voltage feedback signal 213 are illustrated in FIG. 2 as being coupled together, embodiments of the invention comprise additional circuitry illustrated in later figures that distinguish between these signals.

In some embodiments, active power filter 200 may be implemented without current mode control (i.e., using voltage mode control) but with some loss in performance. Without current mode control, input current 210 may be controlled and input ripple current may be attenuated as a second order effect by a very slow response of error amplifier 201. Ripple current reflected back to the electric power bus may be significantly reduced, but input current 210 may not be well regulated.

In some embodiments, output load feedforward signal 214 may be provided by circuitry of an output load subsystem, such as subsystem 108 (FIG. 1) that draws output current 212. Output load feedforward signal 214 may indicate the relative output power or output current drawn by the load subsystem.

In some embodiments, active power filter 200 may be implemented without load current feedforward, but with some loss in performance. Without load current feedforward, the output voltage may still be regulated, but regulation may suffer greatly in response to load changes. This may be desirable in some situations where output current transients are not reflected back to input current 210.

In some embodiments, control circuitry 202 may include a pulse width modulator (PWM) 203 for comparing control signal 216 with current sense signal 218 to generate current regulation signal 220 for power converter circuitry 206. In these embodiments, current regulation signal 220 may comprise switching signals in which the duty cycle of the switching signals may be modulated based, at least in part, on a difference between control signal 216 and current sense signal 218.

Active power filter 200 may also comprise power converter circuitry 206 to draw input current 210 and provide output current 212 based at least in part on current regulation signal 220. Power converter circuitry 206 may comprise either an isolated power converter, such as a flyback, forward, push pull, or full bridge power converter, or a non isolated power converter, such as a boost, buck, buck boost, or tapped buck power converter, or multiple paralleled converters, although the scope of the invention is not limited in this respect.

Figure 3:
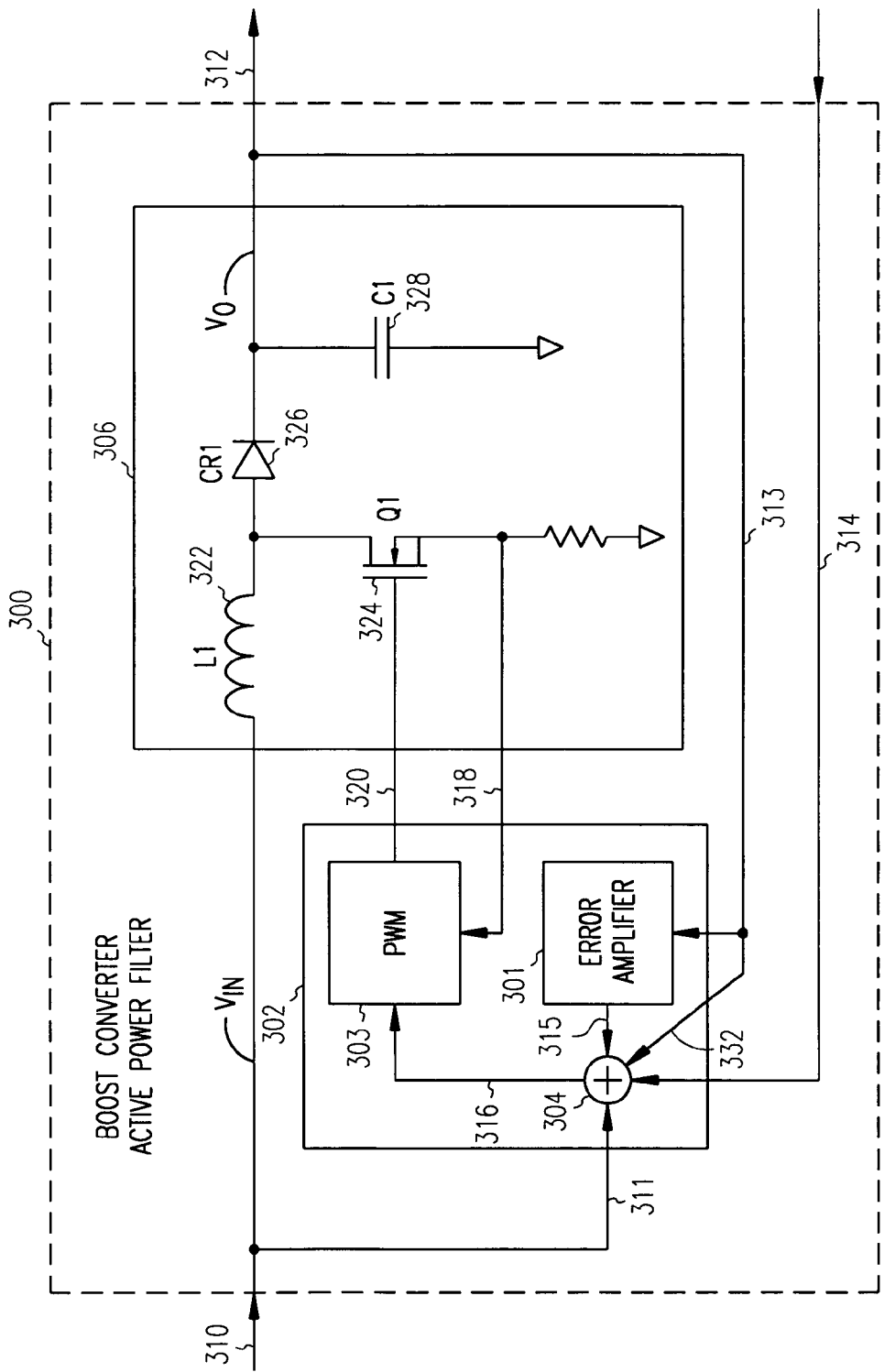
FIG. 3 is a functional block diagram of an active power filter in accordance with some embodiments of the present invention.

FIG. 3 is a functional block diagram of an active power filter in accordance with some embodiments of the present invention. Active power filter 300 may be suitable for use as active power filter subsystem 102 (FIG. 1), although other active power filter topologies or configurations may also be suitable. Active power filter 300 draws input current 310 from a power source, such as power source subsystem 104 (FIG. 1), and provides output current 312. In some embodiments, active power filter 300 may achieve an input ripple current attenuation exceeding 30 dB. Active power filter 300 comprises control circuitry 302 and power converter circuitry 306.

Control circuitry 302 may include error amplifier 301, summing circuitry 304, and PWM 303. Summing circuitry 304 combines error amplifier output voltage 315, input voltage feedforward signal 311, output load feedforward signal 314, and output voltage feedforward signal 332 to generate control signal 316 that may be compared to current sense signal 318 to control the input current on a cycle-by-cycle basis, regulating the input current to a near DC level. This may provide significant attenuation of the input ripple current.

Power converter circuitry 306 may utilize either an isolated power converter, such as a flyback, forward, push pull, or full bridge power converter, or a non isolated power converter, such as a boost, buck, buck boost, or tapped buck power converter, or multiple paralleled converters, although the scope of the invention is not limited in this respect; a continuous current boost converter is provided herein only as an illustrative example.

In some embodiments, active power filter 300 may comprise one or more power converters 306, and one or more control circuits 302, although the scope of the invention is not limited in this respect. In some embodiments, output rectifier element 326 may comprise a diode, such as a silicon carbide (SiC) Schottky diode, although the scope of the invention is not limited in this respect. In some embodiments, inductive element 322 may comprise one or more inductors, and/or charge storage element 328 may comprise one or more capacitors, although the scope of the invention is not limited in this respect. In some embodiments, switching element 324 may comprise one or more switches or switching transistors, such as N-channel MOSFETs, although the scope of the invention is not limited in this respect.

Current sense signal 318 may be proportional to an amount of current drawn through switching element 324, output voltage feedback signal 313 may be proportional to the output voltage (Vo), input voltage feedforward signal 311 may be proportional to the input voltage (Vin), output load feedforward signal 314 may be proportional to the amount of power or current drawn by an output load subsystem, and output voltage feedforward signal 332 may be proportional to the output voltage (Vo). Although output voltage feedforward signal 332 and output voltage feedback signal 313 are illustrated in FIG. 3 as being coupled together, embodiments of the invention comprise additional circuitry illustrated in later figures that distinguish between these signals.

In some embodiments, active power filter 300 may be a current mode control converter which regulates current through switching element 324 on a cycle-by-cycle basis using current sense signal 318 to tightly regulate input current 310 to a DC level, thereby providing significant attenuation of the input ripple current. In these embodiments, active power filter 300 may also regulate the output voltage (Vo) with a low or very low bandwidth output voltage regulation control loop to help ensure that the error amplifier output (e.g., signal 315) does not modulate at frequencies to be attenuated.

In some embodiments in which active power filter 300 includes a low or very low bandwidth control loop for helping to regulate the output voltage (Vo), a high bandwidth current sense signal may be used to tightly regulate input current 310 using current mode control. In these embodiments, control circuitry 302 may implement the control loops with an error amplifier that receives output voltage feedback signal 313. Summing circuitry 304 may combine error amplifier output voltage 315 with input voltage feedforward signal 311, and output load feedforward signal 314 to generate control signal 316. PWM 303 may further implement the control loops by comparing control signal 316 with current sense signal 318 to help control the current drawn by switching element 324.

In some embodiments of active power filter 300, weighting constants may be calculated to provide an optimum response to input voltage changes and output load changes. For example, the weighting constant for input voltage feedforward signal 311 may be calculated assuming that for a given output load, input current 310 changes as a function of the input voltage. Assuming the use of current mode control for this example, control voltage 316 may vary as a function of input voltage. Assuming further for calculation purposes that error amplifier output voltage 315 does not change, and that output load feedforward signal 314 does not change, then input voltage feedforward signal 311 may be scaled to provide the correct variation in control voltage 316.

A weighting constant for output load feedforward signal 314 may be calculated assuming that for a given input voltage, the input current changes as a function of the output load. Assuming again the use of current mode control, control voltage 316 may vary as a function of output load current. Assuming further for calculation purposes that error amplifier output voltage 315 does not change, and that input voltage feedforward signal 311 does not change, then output load feedforward signal 314 may then be scaled to provide correct variation in control voltage 316. In some embodiments, a DC offset may be added to set the error amplifier output voltage 315 in a desired voltage range.

In some embodiments of active power filter 300, any residual modulation of the input current due to output voltage ripple may be substantially cancelled by a small amount of offset modulation produced by the combining of output voltage feedforward signal 332 with error amplifier output voltage 315, input voltage feedforward signal 311 and output load feedforward signal 314. Output voltage feedforward signal 332 may then be scaled to provide sufficient attenuation of input ripple current.

As can be seen from examination of active power filter 300, when input current 310 is a regulated DC input current, the average current in output rectifier element 326 may be regulated at a fixed level proportional to input current 310 and the operating duty cycle. Also, for a fixed regulated average current in output rectifier element 326 and output current 312 having significant ripple current, the difference between the current in output rectifier element 326 and output load current 312 is provided by charge storage element 328, depending on the relative levels between the two currents. Output voltage ripple may be a function of the ripple current and the output capacitance. In some embodiments, charge storage element 328 may provide a sufficient amount of output capacitance to maintain a sufficiently low amount of output ripple voltage. However, in many if not most cases, the amount of output capacitance required to maintain a sufficiently low amount of output ripple voltage may be prohibitively large and contain a prohibitive amount of mass. In some embodiments of the present invention, to help minimize output capacitance (e.g., in both volume and mass) this output ripple voltage may be allowed to be a significant fraction of the DC output voltage, although the scope of the invention is not limited in this respect.

Although system 100 (FIG. 1), active power filter 200 (FIG. 2), and active power filter 300 (FIG. 3) are illustrated as having several separate functional elements, one or more of the functional elements may be combined and may be implemented by combinations of elements for performing at least the functions described herein.

Figure 4:
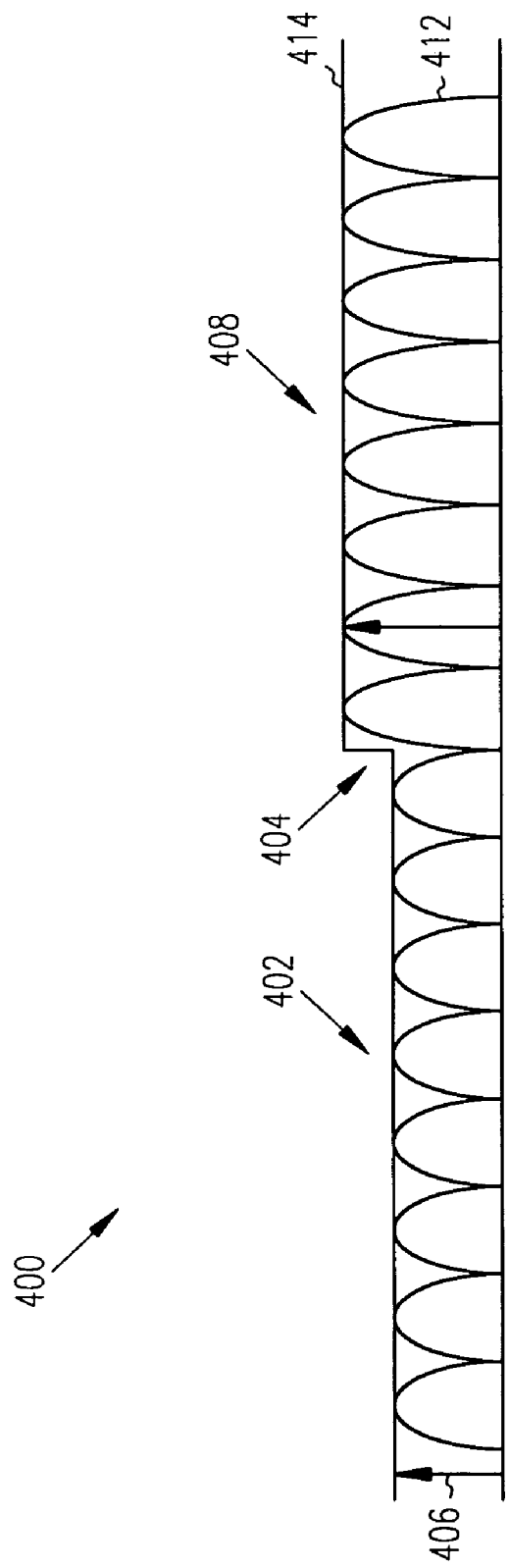
FIG. 4 illustrates an output load feedforward signal and output load current in accordance with some embodiments of the present invention.

FIG. 4 illustrates an output load feedforward signal and output load current in accordance with some embodiments of the present invention. Waveforms 400 include output load feedforward signal 414 and output current waveform 412. Output load feedforward signal 414 may correspond to output load feedforward signal 114 (FIG. 1), output load feedforward signal 214 (FIG. 2), and/or output load feedforward signal 314 (FIG. 3). Output current waveform 412 may correspond to output current 112 (FIG. 1), output current 212 (FIG. 2), and/or output current 312 (FIG. 3). In accordance with some embodiments of the present invention, output load feedforward signal 414 indicates the relative power or load current drawn by the load subsystem such as subsystem 108 (FIG. 1). In some embodiments, output load feedforward signal 414 may indicate when current drawn by an output load subsystem, such as subsystem 108 (FIG. 1), changes or is anticipated to change. In some embodiments, output load feedforward signal 414 may be viewed as a modulation envelope of output current waveform 412. A step function load increase is illustrated for clarity, although the scope of the invention is not limited in this respect.

During time 402, output load feedforward signal 414 may indicate lower current draw 406 of output current waveform 412. During time 408, output load feedforward signal 414 may indicate greater current draw 410 of output current waveform 412. In accordance with some embodiments, output load feedforward signal 414 indicates an increase in output current waveform 412 at time 404. In some embodiments, output load feedforward signal 414 may change its value just prior to the change in output current waveform 412, allowing an active power filter to respond to an anticipated increase or decrease in current to be drawn by a load subsystem. In some embodiments, the change in the level of output load feedforward signal 414 may be proportional to the anticipated or actual change in the current draw by the load subsystem.

Figure 5:
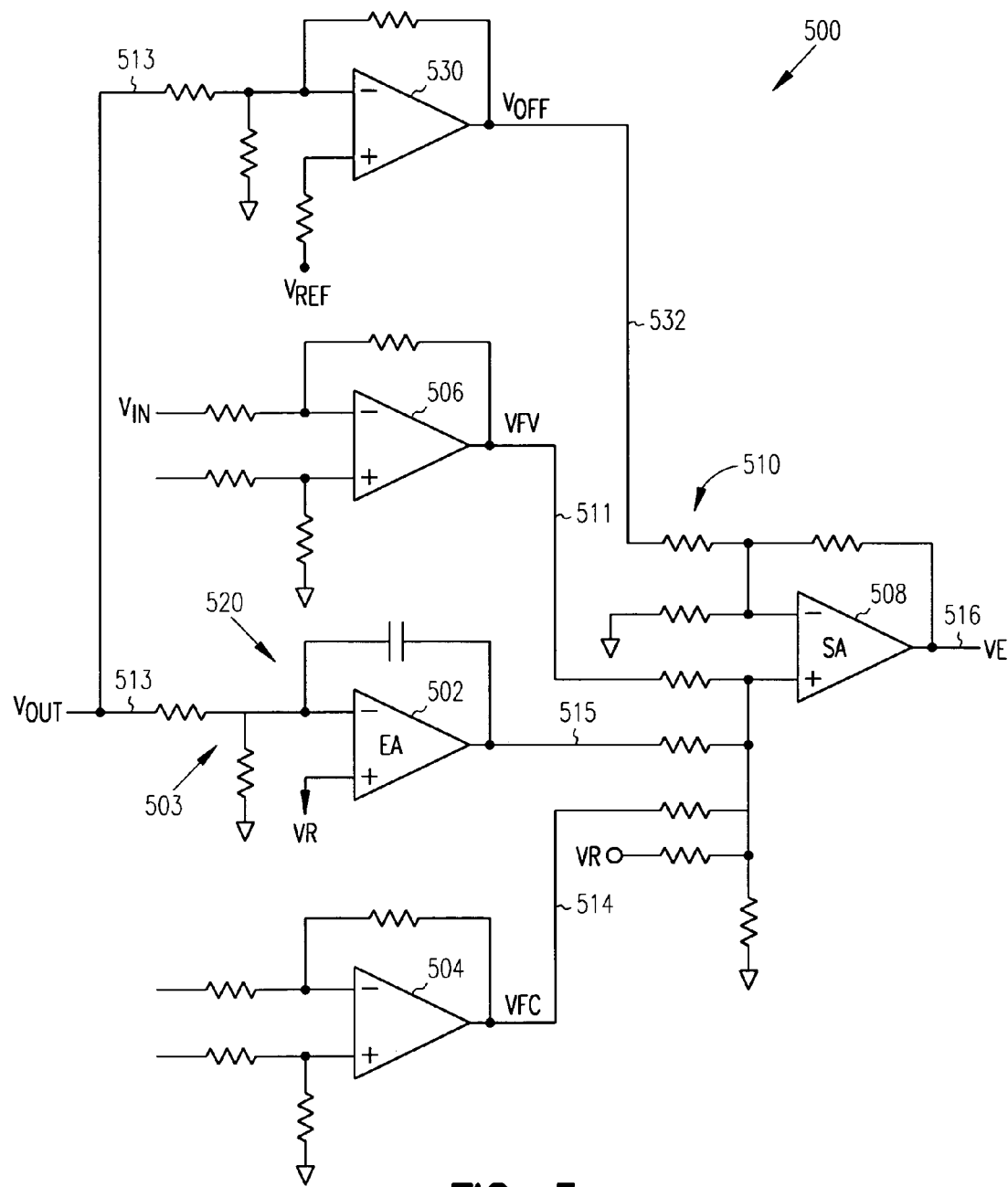
FIG. 5 is a circuit diagram of control circuitry in accordance with some embodiments of the present invention.

FIG. 5 is a circuit diagram of control circuitry in accordance with some embodiments of the present invention. Control circuitry 500 may be suitable for use as part of control circuitry 202 (FIG. 2) and/or part of control circuitry 302 (FIG. 3), although other circuitry may also be suitable. In some embodiments, control circuitry 500 may comprise error amplifier 502 and associated circuitry 520, and a voltage reference (VR), and summing amplifier 508 to sum error amplifier output voltage 515 with input voltage feedforward signal 511, output load feedforward signal 514, and output voltage feedforward signal 532 to generate control signal 516. A +5V reference is discussed, but the scope of the invention is not limited in this respect; a different reference voltage may be used.

In some embodiments, control circuitry 500 may also include output voltage feedforward signal amplifier 530 to operate on output voltage feedback signal 513 and generate output voltage feedforward signal 532. In some embodiments, output voltage feedback signal 513 may correspond to output voltage feedback signal 213 (FIG. 2) and 313 (FIG. 3), input voltage feedforward signal 511 may correspond to input voltage feedforward signal 211 (FIG. 2) and 311 (FIG. 3), output load feedforward signal 514 may correspond to output load feedforward signal 214 (FIG. 2) and 314 (FIG. 3), error amplifier output voltage 515 may correspond to error amplifier output voltage 215 (FIG. 2) and 315 (FIG. 3), and control signal 516 may correspond to control signal 216 (FIG. 2) and 316 (FIG. 3).

In some embodiments, control circuitry 500 further comprises circuit elements 510, such as resistors, to weight or change the relative contribution of the inputs of the summing amplifier 508. The selection of the weightings may depend on many factors including system dynamics.

In some embodiments, control circuitry 500 may also comprise output load feedforward signal amplifier 504 to amplify, scale, or offset output load feedforward signal 514 prior to summing by summing amplifier 508, although the scope of the invention is not limited in this respect. In some embodiments, control circuitry 500 may also comprise input voltage feedforward signal amplifier 506 to amplify, scale, or offset input voltage feedforward signal 532 prior to summing by summing amplifier 508, although the scope of the invention is not limited in this respect.

In some embodiments, associated circuitry 520 of error amplifier 502 may have their values selected to provide a bandwidth of the control loop that is significantly less than the nominal frequency of the current ripple of the load subsystem. This may be done to help ensure that the error amplifier output does not modulate at the frequencies to be attenuated. A control loop bandwidth may be chosen to be, for example, on the order of 1/10 to 1/30 of the lowest frequency to be attenuated. This may provide a control loop gain of −20 dB to −30 dB at the lowest frequency to be attenuated, with a resulting ripple attenuation of approximately −20 dB to −30 dB respectively, although the invention is not limited in this respect. It is to be noted that lower loop bandwidths will provide greater attenuation at the ripple frequencies.

Accordingly, error amplifier output voltage 515 may be slow to react to changes in the output voltage of an active power filter, resulting in a possible loss of output voltage regulation in the case of input voltage transients or output load transients. Input voltage feedforward and output load feedforward may be added to maintain output voltage regulation. Summing input voltage feedforward signal 511 and output load feedforward signal 514 to the error amplifier output voltage by use of summing amplifier 508 allows control voltage 516 to change as rapidly as either the input voltage changes or output load changes, allowing the active power filter to maintain regulation of the output voltage. Any residual modulation of the input current of active power filter 200 (FIG. 2) or active power filter 300 (FIG. 3) due to output voltage ripple may be substantially cancelled by a small amount of offset modulation produced by the combining of output voltage feedforward signal 532 with the input voltage feedforward and the output load feedforward signals by use of summing amplifier 508 as illustrated in FIG. 5.

In some embodiments, the weighting of the feedforward signals may require that the loading of each feedforward signal on the other be taken into account for an optimum response, and that the loading of the error amplifier output on the feedforward signals be taken into account for an optimum response. In some embodiments, error amplifier output voltage 515 and output load feedforward signal 514 may be offset with a reference voltage (VR), although the scope of the invention is not limited in this respect.

Figure 6A:
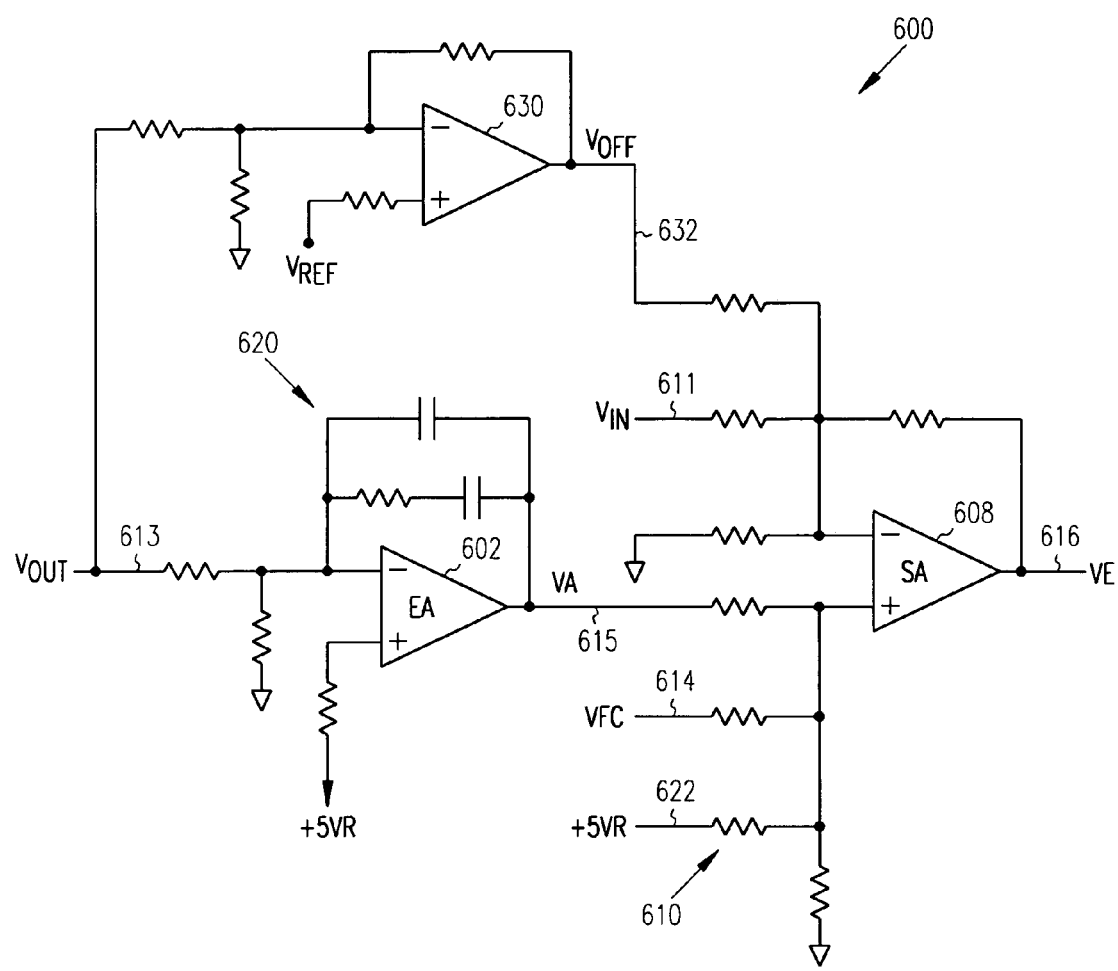
FIG. 6A is a circuit diagram of control circuitry in accordance with some other embodiments of the present invention.

FIG. 6A is another circuit diagram of control circuitry in accordance with some embodiments of the present invention. Control circuitry 600 may be suitable for use as part of control circuitry 202 (FIG. 2) and/or part of control circuitry 302 (FIG. 3), although other circuitry may also be suitable. In some embodiments, control circuitry 600 may comprise error amplifier 602 and associated circuitry 620, a voltage reference (VR), and summing amplifier 608 to sum error amplifier output voltage 615 with input voltage feedforward signal 611, output load feedforward signal 614, and output voltage feedforward signal 632 to generate control voltage 616. A +5V reference is discussed, but the scope of the invention is not limited in this respect; a different reference voltage may be used.

In some embodiments, output voltage feedback signal 613 may correspond to output voltage feedback signal 213 (FIG. 2) and 313 (FIG. 3), input voltage feedforward signal 611 may correspond to input voltage feedforward signal 211 (FIG. 2) and 311 (FIG. 3), output load feedforward signal 614 may correspond to output load feedforward signal 212 (FIG. 2) and 312 (FIG. 3), and control signal 616 may correspond to control signal 216 (FIG. 2) and 316 (FIG. 3).

In some embodiments, control circuitry 600 may also include output voltage feedforward signal amplifier 630 to operate on output voltage feedback signal 613 and generate output voltage feedforward signal 632. Any residual modulation of the input current of active power filter 200 (FIG. 2) or active power filter 300 (FIG. 3) due to output voltage ripple may be substantially cancelled by a small amount of offset modulation produced by the combining of output voltage feedforward signal 632 with the input voltage feedforward and the output load feedforward signals by use of summing amplifier 608 as illustrated in FIG. 6A.

In some embodiments, control circuitry 600 further comprises circuit elements 610, such as resistors, to weight or change the signal levels of the error amplifier output voltage 615, input voltage feedforward signal 611, output load feedforward signal 614, and output voltage feedforward signal 632 prior to summing by summing amplifier 608. In these embodiments, the weighting of the feedforward signals may require that the loading of each feedforward signal on the other be taken into account for an optimum response, and that the loading of the error amplifier output on the feedforward signals be taken into account for an optimum response. In some embodiments, the error amplifier output voltage 615 and the output load feedforward signal 614 may be offset with reference voltage 622 (VR), although the scope of the invention is not limited in this respect. Reference voltage 622 may be a +5 volt reference, although the scope of the invention is not limited in this respect.

In some embodiments, associated circuitry 620 of error amplifier 602 may have their values selected to provide a bandwidth of the control loop significantly less than the nominal frequency of the current ripple desired to be attenuated. This may be done to help ensure that the error amplifier output does not modulate at the frequencies to be attenuated. A control loop bandwidth may be chosen to be on the order of $\frac{1}{10}$ to $\frac{1}{30}$ of the lowest frequency to be attenuated, although the invention is not limited in this respect. Accordingly, error amplifier output signal 615 may be slow to react to changes in the output voltage of an active power filter, resulting in a possible loss of output voltage regulation in the case of input voltage transients or output load transients. Input voltage feedforward and output load feedforward may be added to maintain output voltage regulation. Summing input voltage feedforward signal 611 and output load feedforward signal 614 to the error amplifier output voltage 615 allows control signal 616 to change as rapidly as either the input voltage changes or output load changes, allowing an active power filter to maintain regulation of its output voltage.

Figure 6B:
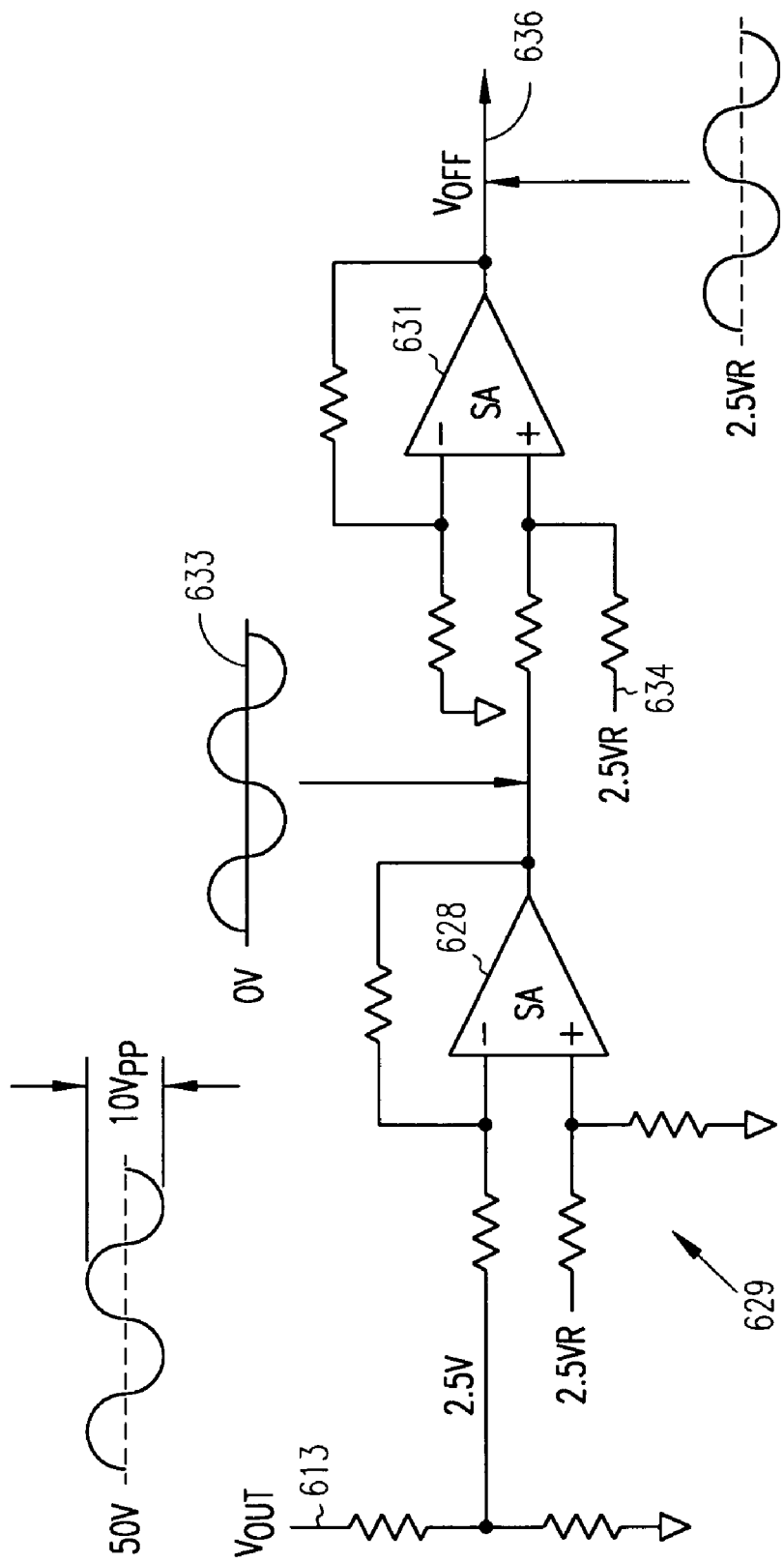
FIG. 6B illustrates circuitry for the generation of an output voltage feedforward signal in accordance with some embodiments of the present invention.

FIG. 6B illustrates circuitry for the generation of an output voltage feedforward signal in accordance with some embodiments of the present invention. Circuitry 629 may be suitable for use as output voltage feedforward signal amplifier 630 (FIG. 6A). In these embodiments, amplifier 628 may be used to subtract out any DC component to generate ripple voltage 633 and amplifier 631 may offset the ripple by reference voltage 634 to generate output 636 offset by the reference. Circuitry other than circuitry 629 illustrated in FIG. 6B may be suitable for use in embodiments of the present invention. A +2.5V reference is illustrated and discussed, but the scope of the invention is not limited in this respect; a different reference voltage may be used.

Figure 6C:
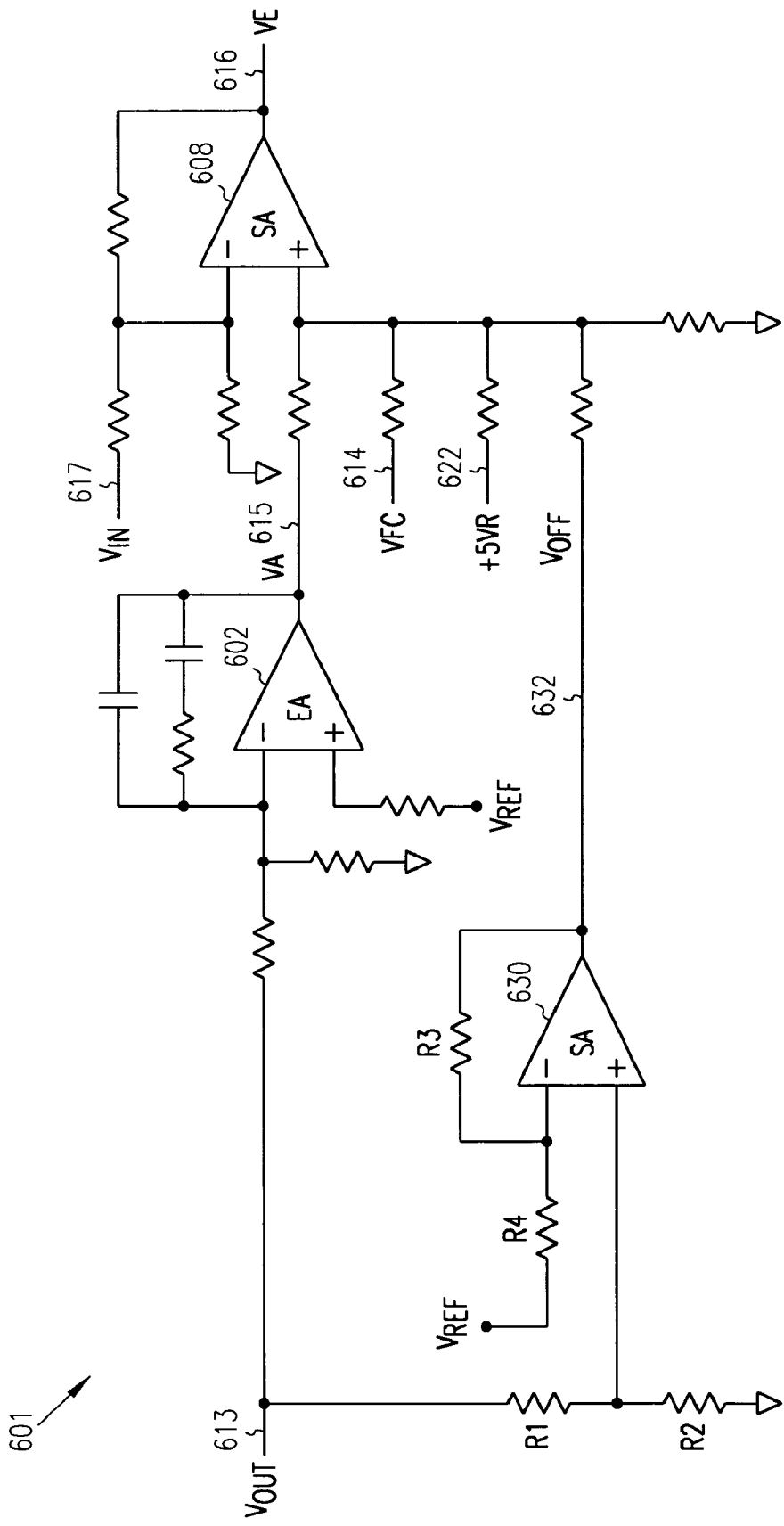
FIG. 6C is a circuit diagram of control circuitry in accordance with yet some other embodiments of the present invention.

FIG. 6C is another circuit diagram of control circuitry in accordance with embodiments of the present invention. Control circuitry 601 may be suitable for use as part of control circuitry 202 (FIG. 2) and/or 302 (FIG. 3), although other circuitry may also be suitable. Control circuitry 601 is similar to control circuitry 600 (FIG. 6A) however output voltage feedforward signal 632 is provided to the other input of summing amplifier 608. The selection of different components can be used to achieve similar results.

Figure 7:
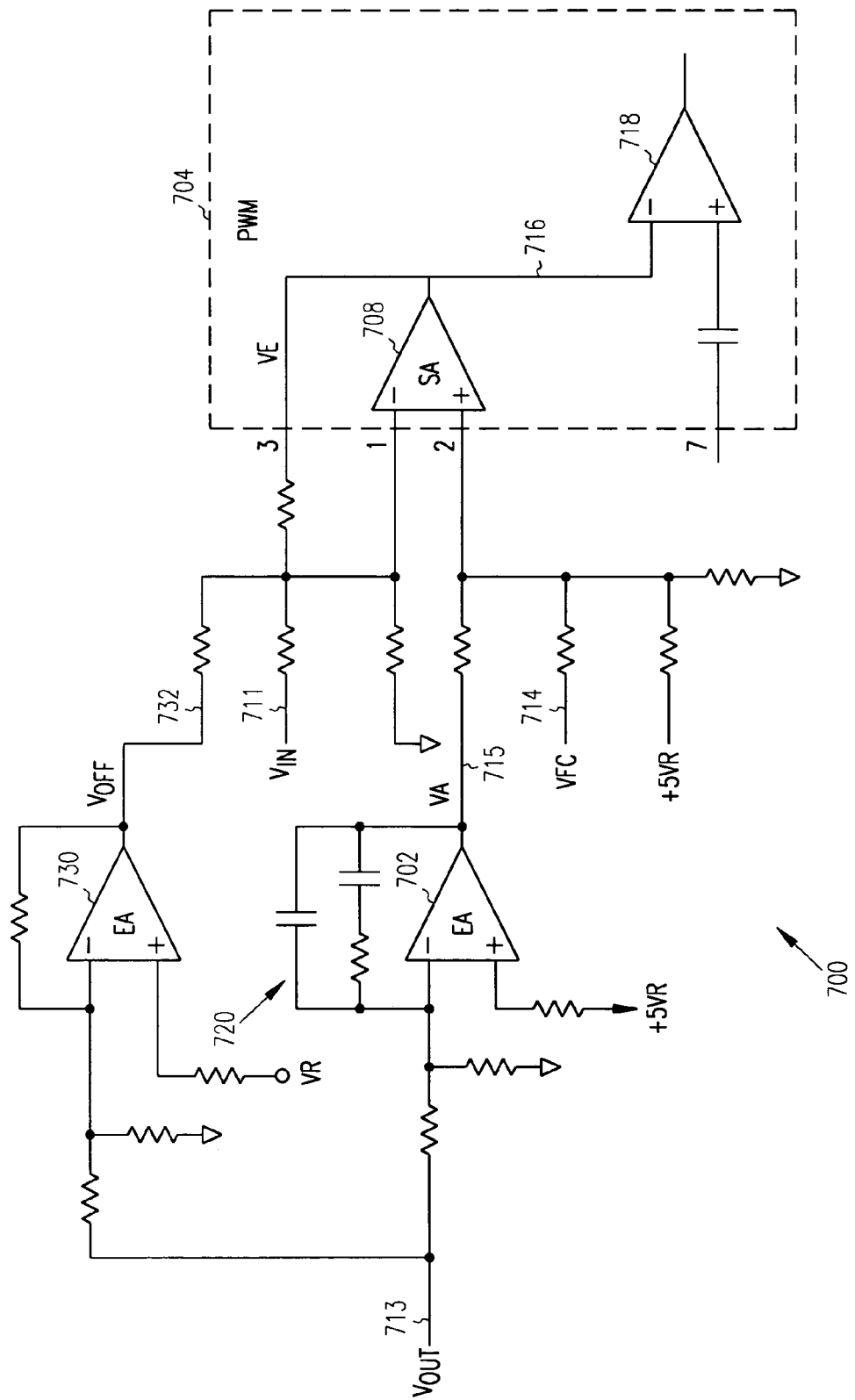
FIG. 7 is a circuit diagram of control circuitry in accordance with some other embodiments of the present invention.

FIG. 7 is a circuit diagram of control circuitry in accordance with some embodiments of the present invention. Control circuitry 700 may be suitable for use as part of control circuitry 202 (FIG. 2) and/or 302 (FIG. 3), although other circuitry may also be suitable. In some embodiments, control circuitry 700 may comprise error amplifier 702, PWM 704, and output voltage feedforward signal amplifier 730. An internal error amplifier of PWM 704 may be used as summing amplifier 708 to sum error amplifier output voltage 715 with input voltage feedforward signal 711, output load feedforward signal 714, and output voltage feedforward signal 732 to generate control signal 716. In some embodiments, error amplifier output voltage 715 may correspond to error amplifier output voltage 515 (FIG. 5) and error amplifier output voltage 615 (FIGS. 6A and 6C); input voltage feedforward signal 711 may correspond to input voltage feedforward signal 511 (FIG. 5) and input voltage feedforward signal 611 (FIGS. 6A and 6C); output load feedforward signal 714 may correspond to output load feedforward signal 514 (FIG. 5) and output load feedforward signal 614 (FIGS. 6A and 6C); output voltage feedforward signal 732 may correspond to output voltage feedforward signal 532 (FIG. 5) and output voltage feedforward signal 632 (FIGS. 6A, 6B, and 6C), although the scope of the invention is not limited in this respect.

PWM 704 may correspond to PWM 203 (FIG. 2) and/or 303 (FIG. 3). In some embodiment, a PWM, such as a standard UC 1823 PWM, may be used for PWM 704, although the scope of the invention is not limited in this respect. In the case of a standard PWM, the internal error amplifier may be used as summing amplifier 708 if all three pins of the error amplifier are available for use. In some embodiments, pin 1 of PWM 704 may be used as the inverting input to summing amplifier 708; pin 2 may be used as the non-inverting input to summing amplifier 708; pin 3 may be used as the output pin of summing amplifier 708. The summing amplifier output on pin 3 may be internally tied to the input of comparator 718 which may be available for current mode control. An external op amp may be added for use as the error amplifier 702.

Figure 8:
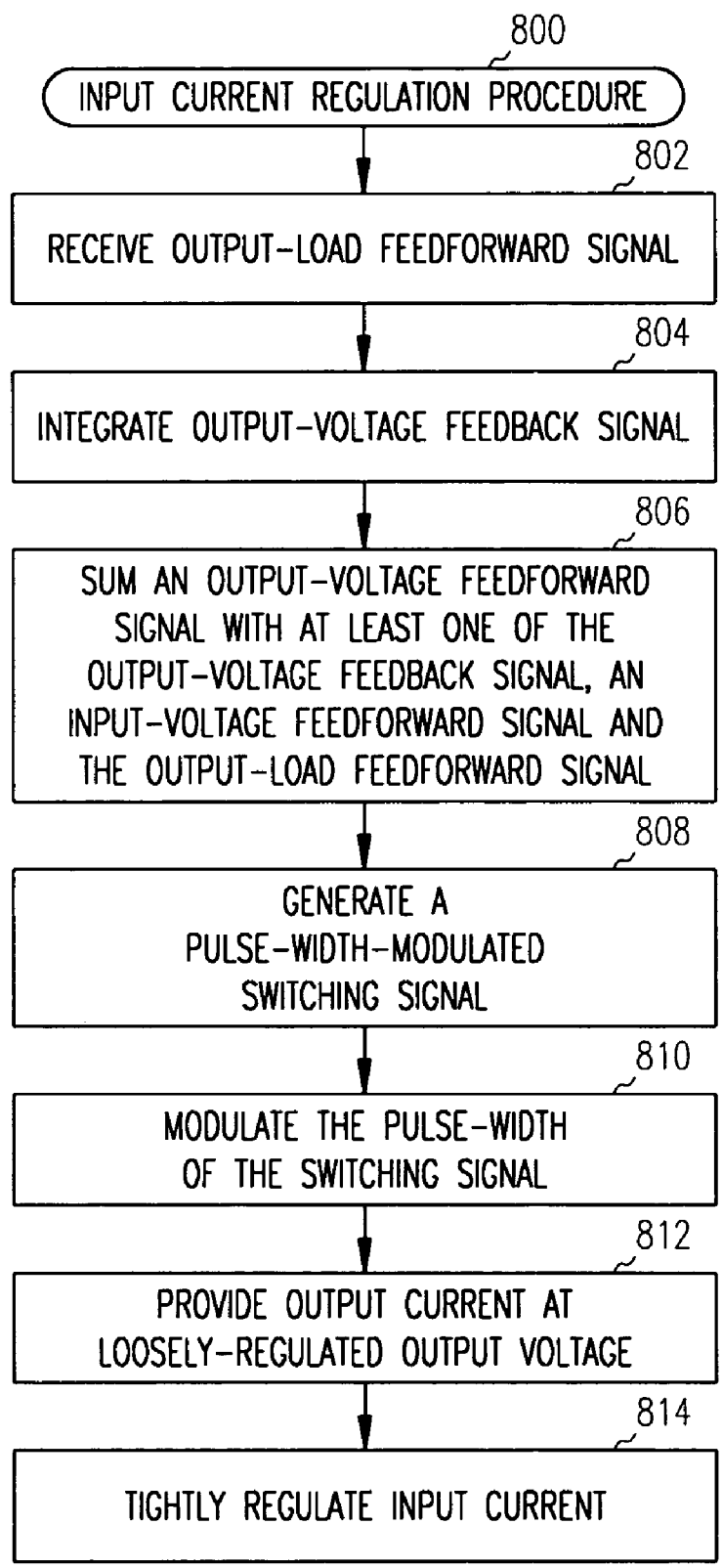
FIG. 8 is a flow chart of an input-current regulation procedure in accordance with some embodiments of the present invention.

FIG. 8 is a flow chart of an input-current regulation procedure in accordance with some embodiments of the present invention. Input-current regulation procedure 800 may be performed by an active power filter, such as active power filter subsystem 102 (FIG. 1), although other active power filters may also be suitable. Procedure 800 may be used to tightly regulate an input current drawn by the active power filter and loosely regulate an output voltage provided to a load, such as load subsystem 108 (FIG. 1).

Operation 802 receives an output-load feedforward signal, such a signal 214 (FIG. 2), indicating when current drawn by the output-load subsystem will change. Operation 804 integrates an output-voltage sense signal, such as signal 213 (FIG. 2) or signal 313 (FIG. 3). The output-voltage sense signal may indicate the output voltage of the active power filter.

Operation 806 sums the integrated output-voltage sense signal (e.g., signal 515 (FIG. 5) or signal 615 (FIG. 6A)) with the input-voltage sense signal (e.g., signal 517 (FIG. 5) or signal 617 (FIG. 6A)), the output load feedforward signal (e.g., signal 514 (FIG. 5) or signal 614 (FIG. 6A)), an output-voltage feedforward signal (e.g., signal 532 (FIG. 5) or signal 632 (FIG. 6A)) to generate a control signal, such as control signal 216 or control signal 316 (FIG. 3), for controlling current drawn by the power converter. The input-voltage sense signal may indicate the input voltage of the power converter.

Operation 808 generates a pulse-width-modulated switching signal which may switch-on and switch-off a switching element of the active power filter. In some embodiments, the switching element draws input current when conducting.

Operation 810 may modulate the pulse-width of the switching signal based on the control signal and a current-sense signal. The current-sense signal may correspond to current-sense signal 218 (FIG. 2) or current-sense signal 318 (FIG. 3) indicating an amount of current drawn through a switching element, such as switching element 324 (FIG. 3).

Operation 812 may provide output current, such as output current 212 (FIG. 2) or output current 313 (FIG. 3), to a load subsystem which draws the output current with an output current ripple at a nominal frequency. In operation 814, the input current drawn may be tightly regulated while the output voltage may be loosely regulated.

Figure 9A:
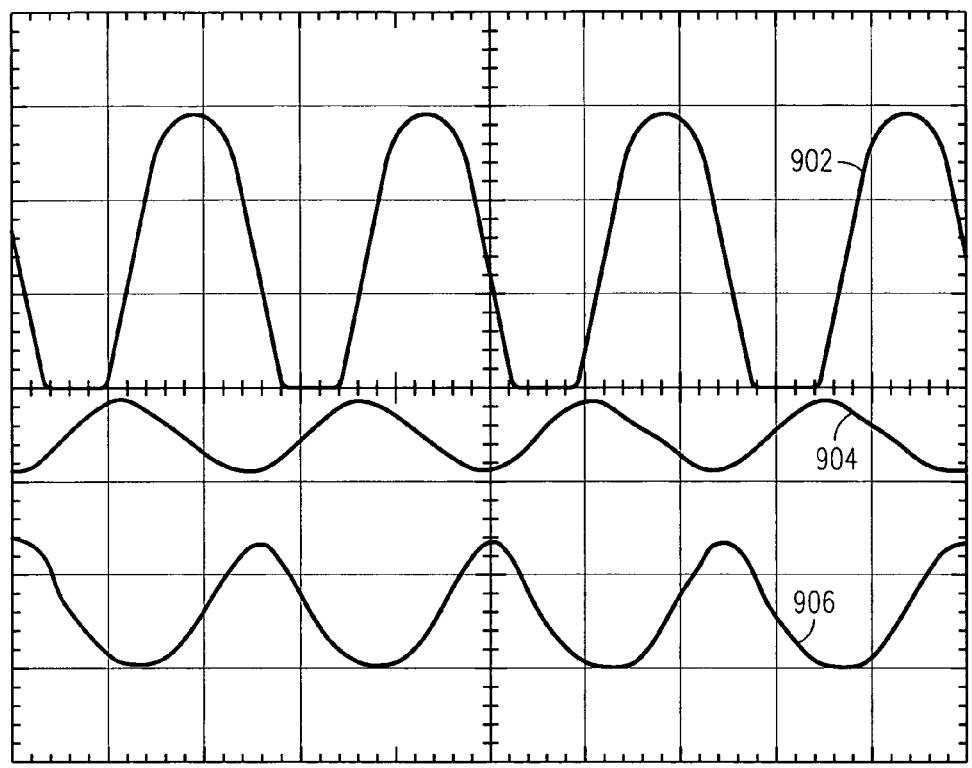
FIGS. 9A and 9B illustrate output load current, output voltage ripple and input current ripple of active powers.
Figure 9B:
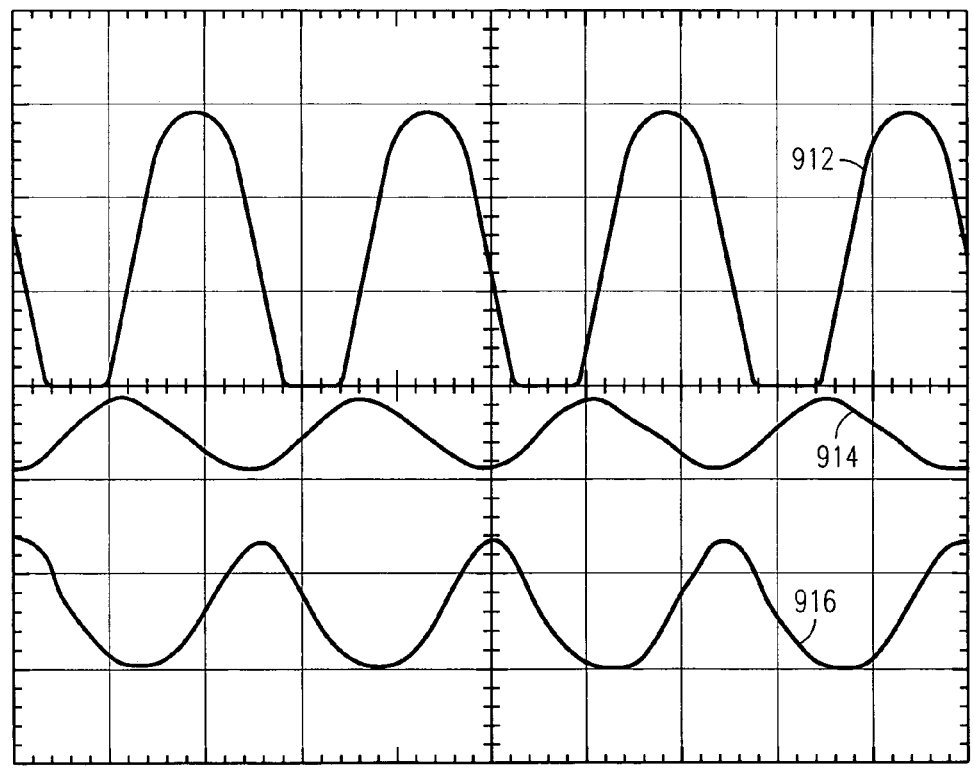

FIGS. 9A and 9B illustrate output load current, output voltage ripple and input current ripple of active power filters. FIG. 9A illustrates waveforms without output voltage feedforward (i.e., of a convention power filter) and FIG. 9B illustrates corresponding waveforms of an active power filter with output voltage feedforward in accordance with some embodiments of the present invention. Trace 902 illustrates output load current at 2 Amps per division, trace 904 illustrates output voltage ripple at 5 volts per division, trace 906 illustrates input current ripple at 100 milliamps per division without output voltage feedforward. Trace 912 illustrates output load current at 2 Amps per division and trace 914 illustrates output voltage ripple at 5 volts per division. Traces 912 and 914 may correspond to either output load current 212 (FIG. 2) or 312 (FIG. 3). Trace 916 illustrates input current ripple at 50 milliamps per division with output voltage feedforward and may correspond to either input current 210 (FIG. 2) or 310 (FIG. 3). Modulation of the input current due to the output voltage ripple is substantially reduced by the addition of output voltage feedforward, although the scope of the invention is not limited to this example.

Thus, active power filters, and methods for regulation of input current, regulation of output voltage, and attenuation of the input ripple current have been described. In some embodiments, input ripple current attenuation exceeding 30 dB may be achieved.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. An active power filter comprising:
   control circuitry to combine an output voltage feedforward signal with at least one of an error amplifier output voltage, an input voltage feedforward signal and an output load feedforward signal to generate a control signal; and
   power converter circuitry to regulate DC input current based at least in part on the control signal,
   wherein the output-load feedforward signal is a separate control signal generated by internal circuitry of an output-load subsystem which draws output current from the active power filter.

2. The active power filter of claim 1 wherein the output voltage feedforward signal is to at least in part cancel modulation of the input current due to output voltage ripple.

3. The active power filter of claim 2 wherein the power converter circuitry comprises a switch-mode power converter, wherein the active power filter further comprises:
   a low bandwidth control loop using input voltage feedforward and output load feed forward to provide input ripple current attenuation; and
   an output voltage feedforward loop to further provide the input ripple current attenuation.

4. The active power filter of claim 2 wherein the output voltage feedforward signal comprises a weighted version of the output voltage feedback signal.

5. The active power filter of claim 4 wherein the output load subsystem draws DC output current from the power converter circuitry and the output load feedforward signal indicates when one of either relative power or the DC output current drawn by the output load subsystem changes.

6. The active power of claim 4 wherein the output load feedforward signal indicates when one of either relative power or the output current is anticipated to change.

7. The active power filter of claim 4 wherein the output load feedforward signal is provided by circuitry of an output load subsystem which draws the output current by power converter circuitry.

8. The active power filter of claim 4 wherein the control circuitry includes an error amplifier to integrate a difference between an output voltage feedback signal and a reference voltage,
   wherein an output load subsystem draws output current from the power converter circuitry having an output current ripple at a nominal ripple frequency, and
   wherein components of the integrator are selected to provide a control loop bandwidth significantly less than ripple frequencies of the output current ripple to be attenuated.

9. The active power filter of claim 4 wherein the control circuitry comprises:
   an error amplifier to integrate a difference between an output voltage feedback signal and a reference voltage to generate an error amplifier output voltage; and
   a summing amplifier to sum the output voltage feedforward signal with at least one of the error amplifier output voltage, the input voltage feedforward signal and the output load feedforward signal to generate an error voltage corresponding to the control signal.

10. The active power filter of claim 9 wherein the control circuitry further comprises circuitry to weight the output voltage feedforward signal and at least one of the error amplifier output voltage, the input voltage feedforward signal and the output load feedforward signal prior to summing by the summing amplifier.

11. The active power filter of claim 10 wherein weights for the output voltage feedforward signal are selected to modulate the control signal to at least partially offset modulation of the input current due to the output voltage ripple.

12. The active power filter of claim 8 wherein the control circuitry further comprises:
   an output load feedforward signal amplifier to amplify the output load feedforward signal prior to summing by the summing amplifier; and
   an input voltage feedforward signal amplifier to amplify the input voltage feedforward signal prior to summing by the summing amplifier.

13. The active power filter of claim 11 wherein the control circuitry comprises a pulse width modulator (PWM) for comparing the control signal with a current sense signal to generate a switching signal for the power converter circuitry, a pulse width of the switching signal being modulated based, at least in part, on a difference between the control signal and the current sense signal.

14. The active power filter of claim 13 wherein the power converter circuitry receives an input current and provides an output current to a load subsystem based at least in part on the switching signal.

15. The active power filter of claim 14 wherein the power converter circuitry is an isolated power converter comprising one or more of a flyback power converter, forward power converter, push-pull power converter, or full bridge power converter, the isolated power converter further comprising one of an isolated buck-derived power converter, boost-derived power converter, or buck-boost-derived power converter.

16. The active power filter of claim 14 wherein the power converter circuitry is a non-isolated power converter comprising one or more of a boost power converter, a buck power converter, a buck-boost power converter, or tapped-buck power converter, the non-isolated power converter further comprising one of a buck-derived power converter, a boost-derived power converter, or a buck-boost-derived power converter.

17. The active power filter of claim 14 wherein the power converter circuitry comprises a plurality of power converters operating in parallel.

18. The active power filter of claim 14 wherein the power converter circuitry operates as current mode converter to regulate current through a switching element on a cycle-by-cycle basis using a current sense signal to tightly regulate the input current and loosely regulate an output voltage.

19. The active power filter of claim 18 wherein:
the current sense signal indicates an amount of current drawn through a switching element;
the output voltage feedback signal indicates the output voltage;
the input voltage feedforward signal indicates an input voltage of the power converter; and
the output load feedforward signal either changes or anticipated changes in current drawn by the output load subsystem.

20. A method of attenuating ripple in DC input current drawn by an active power filter that provides DC output current to a load subsystem, the method comprising:
integrating a difference between an output voltage feedback signal and a voltage reference to generate an error amplifier output voltage; and
summing an output voltage feedforward signal with at least one of the error amplifier output voltage, an input voltage feedforward signal and an output load feedforward signal to generate a control signal for controlling current drawn by the active power filter,
wherein the output load feedforward signal indicates when the DC output current drawn by the load subsystem will change, the output load feedforward signal being generated by internal circuitry of the load subsystem, and
wherein the input voltage feedforward signal indicates an input voltage of the active power filter.

21. The method of claim 20 wherein the output voltage feedforward signal is to at least in part cancel modulation of the input due to output voltage ripple.

22. The method of claim 21 wherein the output voltage feedforward signal comprises a weighted version of the output voltage feedback signal.

23. The method of claim 22 wherein weights for the output voltage feedforward signal are selected to modulate the control signal to at least partially offset modulation of the input current due to the output voltage ripple.

24. The method of claim 23 further comprising:
receiving the output load feedforward signal from the load subsystem;
generating a switching signal to switch on and switch off a switching element, wherein the switching element draws input current when conducting; and
modulating a pulse width of the switching signal based on the control signal and a current sense signal, the current sense signal indicating an amount of current drawn through switching element.

25. The method of claim 24 further comprising providing, by the active power filter, the output current to the load subsystem which draws the output current with an output current ripple at a nominal frequency, whereby the input current drawn by the active power filter is tightly regulated and the output voltage is loosely regulated.

26. An electronics power distribution system comprising:
a load subsystem to draw DC output current and having circuitry to generate an output load feedforward signal to indicate changes in the DC output current drawn by the load subsystem; and
an active power filter subsystem to provide the DC output current to the load subsystem by loosely regulating an output voltage for the load subsystem, the active power filter subsystem to tightly regulate DC input current drawn by the active power filter subsystem based at least in part on the output load feedforward signal,
wherein the active power filter subsystem comprises:
control circuitry to combine an output voltage feedforward signal with at least one of an error amplifier output voltage, an input voltage feedforward signal and the output load feedforward signal to generate a control signal; and
power converter circuitry to regulate input current based at least in part on the control signal.

27. The system of claim 26 wherein the output voltage feedforward signal is to at least in part cancel modulation of the input due to output voltage ripple.

28. The system of claim 27 wherein the output voltage feedforward signal comprises a weighted version of the output voltage feedback signal.

29. The system of claim 28 wherein the load subsystem draws the output current from the power converter circuitry and the output load feedforward signal indicates when one of either relative power or the output current changes.

30. A system of claim 29 wherein the system comprises a satellite system and the load subsystem comprises a cryogenic cooling system having a motor to drive a cryogenic cooling pump,
wherein the cryogenic cooling system generates the output load feedforward signal, the output load feedforward signal being related to current drawn by the motor.

31. The system of claim 29 wherein the system comprises a system for generating pulsed energy, wherein the load subsystem generates the output load feedforward signal, the output load feedforward signal being related to current drawn by the load subsystem.

* * * * *